United States Patent [19]
Horstmann

[11] 4,445,142
[45] Apr. 24, 1984

[54] METHOD AND APPARATUS FOR FREQUENCY CHARACTERISTIC COMPENSATION OF TELEVISION SIGNALS REPRODUCED FROM A TAPE RECORD WITH REFERENCE TO POSITION OF SYNCHRONIZING SIGNALS ON THE TAPE

[75] Inventor: Winfried Horstmann, Griesheim, Fed. Rep. of Germany

[73] Assignee: Robert Bosch GmbH, Fed. Rep. of Germany

[21] Appl. No.: 214,406

[22] Filed: Dec. 8, 1980

[51] Int. Cl.³ ............................................. H04N 4/941
[52] U.S. Cl. .................................... 358/318; 358/315
[58] Field of Search ...................... 358/8, 27, 315, 318; 360/36, 65, 36.1

[56] References Cited

U.S. PATENT DOCUMENTS

| | | | |
|---|---|---|---|
| 3,340,367 | 9/1967 | Coleman et al. | 179/100.2 |
| 3,715,462 | 2/1973 | Krause | 178/5.4 CR |
| 3,717,721 | 2/1973 | Makara et al. | 358/316 |
| 4,148,079 | 4/1979 | Horstmann | 360/36 |

FOREIGN PATENT DOCUMENTS

| | | |
|---|---|---|
| 1296166 | 5/1969 | Fed. Rep. of Germany. |
| 1944378 | 12/1971 | Fed. Rep. of Germany. |
| 2638869 | 3/1978 | Fed. Rep. of Germany. |

OTHER PUBLICATIONS

RCA Review, vol. XIV, No. 1, Mar. 1953, pp. 599, R. C. Dennison, Aperture Compensation for Television Camera.

Primary Examiner—Aristotelis M. Psitos
Attorney, Agent, or Firm—Frishauf, Holtz, Goodman & Woodward

[57] ABSTRACT

There is shown a method for correction of rapid periodic frequency characteristic errors in the reproduction of signals with periodic synchronizing signals from magnetic tape as well a circuit arrangement for carrying out the method. For repeated correction of the error within the period between two successive synchronizing signals, there are brought into account the stored error magnitudes of similarly positioned synchronizing signals on adjacent tracks, since the synchronizing signals of successive oblique tracks are offset by a fraction of a line.

The circuit arrangement comprises a storage device with a number of storage places corresponding to the number of lines and/or to the number of color television signals of a television picture. In each storage place the average value of the frequency response error of previous lines of the same kind is stored and is superimposed on the actual error value.

3 Claims, 3 Drawing Figures

METHOD AND APPARATUS FOR FREQUENCY CHARACTERISTIC COMPENSATION OF TELEVISION SIGNALS REPRODUCED FROM A TAPE RECORD WITH REFERENCE TO POSITION OF SYNCHRONIZING SIGNALS ON THE TAPE

This invention concerns the correction of rapid periodic frequency response errors in the reproduction of signals such as color television signals that include periodic synchronizing signals, particularly color television signals played back from the magnetic tape recorded on a large number of adjacent track portions disposed obliquely on the tape so that the horizontal synchronizing signals in succeeding oblique tracks are offset in position from one track to the next.

STATE OF THE ART

In the magnetic storage of broad-band signals on ribbon-shaped recording carriers, for obtaining the necessary large relative velocities between the electromagnetic transducers (magnetic heads) and the recording carrier (magnetic tape), general systems have come into use in which the magnetic heads disposed on the periphery of a rapidly revolving head disc pass across the relatively slowly running magnetic tape at an oblique angle to the tape median line. The stored information is accordingly fixed on the tape in a series of parallel closely spaced succeeding track sections and can be picked up from there with an apparatus of the same system as the one used for recording.

Magnetic tape apparatus of this kind are used especially for storage of television signals.

In known systems, the head wheel equipped with one or more magnet heads rotates in the ring gap of a transversely partitioned guide cylinder which is helically encircled by the relatively narrow magnetic tape. The surface velocity of the head wheel is substantially higher than the tape transport velocity hence, the track segments inscribed on the magnetic tape by the magnetic head, or magnetic heads, as the result of the spiral-shaped encirclement of the head wheel, run at an oblique angle to the tape longitudinal direction, each track segment representing the content of a television picture or a part of the same. In spite of the great relative velocity with which the magnetic heads pass across the surface of the magnetic tape, the recorded wavelengths are in part so small in case of the storage of color television signals that they can be recorded and produced without difficulty only when the magnetic heads are in direct contact with the surface of the magnetic tape. the head are, therefore, in general, so arranged at the periphery of the revolving head disc that they have a radial protrusion and they distort the magnetic tape elastically during their contact. In this intermittent manner of operation, therefore, each magnetic head dips into tape beginning at the edge of the tape dips and leaves it in the neighborhood of the oppositely lying edge of the magnetic tape. In consequence there can occur head-to-tape applied pressure changes with consequent amplitude changes of the frequency-modulated signal picked up from the magnetic tape. By the change of the amplitude-frequency response characteristic, color saturation errors can arise.

A method and a circuit arrangement for avoiding this error is known from German Pat. No. 19 44 378 and corresponding U.S. Pat. No. 3,715,462. Controllable frequency characteristic distortion correctors are in this case arranged in the signal path that are so adjusted that the desired amplitude of the color synchronizing signal corresponds to a comparison voltage and thereby the amplitude values of the color auxiliary carrier are also somewhat correctly reproduced. The described method is effective if the error magnitude does not substantially vary between the time of reproduction of the color synchronizing signal and the time of reproduction of the picture component. It fails if the error frequency is so great that no simple relation exists between the amplitude of the color synchronizing signal and of the color auxiliary carrier.

Furthermore, from DE-OS No. 26 38 869 and corresponding U.S. Pat. No. 4,148,079 there is known a method for correction of rapid periodic timing errors which are due to similar causes. For compensation of a rapidly varying amplitude-frequency response characteristic, that known method is not suitable.

THE INVENTION

The invention has the object of providing a method and an apparatus for compensation of rapid frequency characteristic variation in the reproduction of color television signals from magnetic storage media.

According to the invention, correction of the error in the amplitude-frequency characteristic is performed several times in the time period between two successive synchronizing signals of a track and error magnitudes stored for the purpose are utilized with reference to similarly located synchronizing signals of tracks previously scanned.

The invention makes it possible, generally, to compensate out the effect of periodic head-to-tape applied pressure errors in the reproduction of color television signals several times within the period of a television line. It is based on the recognition that the head-to-tape applied pressure errors of neighboring tracks are essentially the same and on the evaluation of the circumstance that the synchronizing signals of neighboring tracks are offset with reference to the tape edge whenever there is subdivision of the television picture among several tracks of the magnetic tape.

Further details of the invention will be better appreciated in connection with the description of an example.

DRAWING

The invention is more closely explained in what follows with reference to the drawing which represent an embodiment example.

DESCRIPTION OF THE INVENTION

Figure 1:
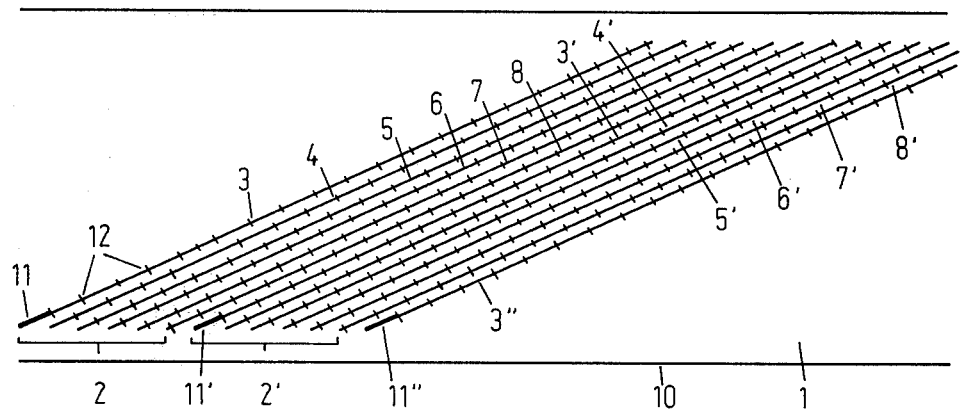
FIG. 1 shows by way of example, a track pattern of a magnetic tape device according to the general type of system involved.

In FIG. 1 there is designated with 1 the magnetic tape, which at an oblique angle to the tape edge 10 contains in successive tracks 3, 4, 5, 6, 7, 8; 3' 4' 6' 7', 8'; 3'' ... the color television information inclusive of the related synchronizing signals (vertical synchronizing signals 11, 11', 11'', and horizontal synchronizing signal 12). Every six tracks 3, 4, 5, 6, 7, 8; 3', 4', 5', 6', 7', 8' represent the content of one color television picture and are grouped into a so-called line packet 2; 2''. According to the color television system defined by the European EBU-Standard, a television full picture is represented by 625 lines. In the recording of such a television picture by means of an oblique track magnetic tape device with 180° passes of the magnetic heads arranged with two of them on the periphery of the head wheel and the here represented arrangement of six tracks to a packet, there results a track length of 52 1/12 lines. Per head wheel revolution, there are accordingly written 104 1/6 lines, therefore with six head wheel revolutions, 625 lines. As the result of the diametral arrangement of two magnetic heads on the circumference of the head wheel, there results that, every time, six tracks are written by one magnetic head and six interleaved tracks by the other magnetic head.

In FIG. 1, for reasons of clearness, only the tracks are shown that are written from one particular magnetic head on the tape. Each track accordingly contains somewhat more than 52 lines and the offset of the horizontal synchronizing signals of two successive tracks with reference to the tape edge amounts to 1/6 of a line.

The invention is based on the recognition that periodic frequency response variations, that are due to the influences of the mechanical contact relationships between the magnetic tape and the magnetic heads, more or less repeat themselves for each magnetic head with each revolution of the head wheel. In other words, beginning from the tape edge, the error curve, referred to the spacing from the tape edge, has about the same course for all tracks of one magnetic head. Since the horizontal synchronizing signals of one line packet written by one head are off-set each time by 1/6 line length with respect to the tape edge, it is now possible to determine and to compensate, by transfer of the geometric locations of the color synchronizing signals of five previous tracks to the sixth track the magnitude of the head-to-tape applied pressure not only at the beginning of the line, but also five times more in the course of the line.

Figure 2:
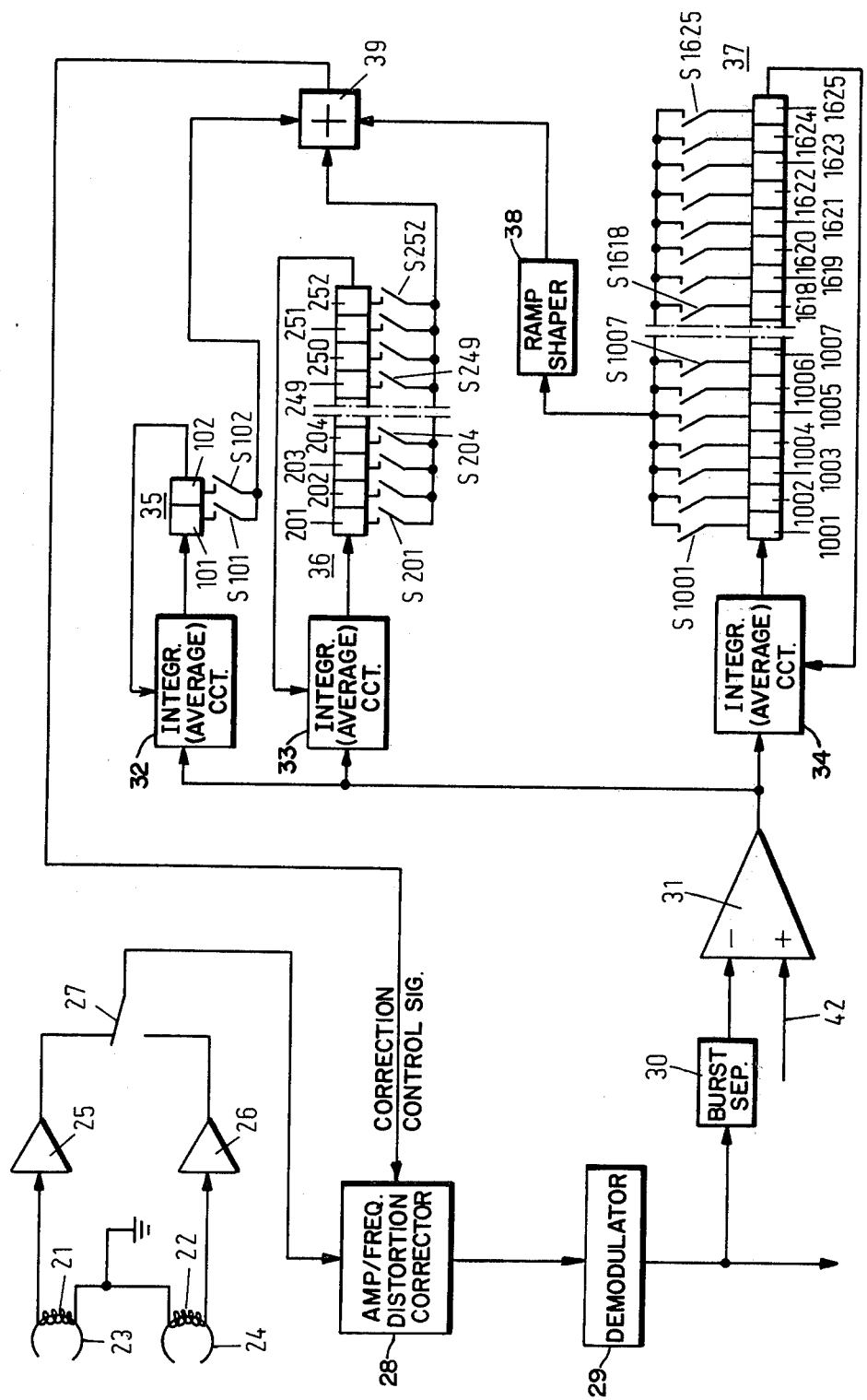
FIG. 2 shows a circuit arrangement for carrying out the method of the invention.

FIG. 2 shows as an example of an embodiment of a circuit arrangement for carrying out the method according to the invention. The color television information recorded on the (not shown) magnetic tape by means of frequency modulation is picked up in reproduction alternately by the coils 21, 22 of the magnetic heads 23, 24 and is brought in the reproduction amplifiers 25, 26 to a level which makes possible further processing.

The transfer switch 27 is switched over by a timing signal coupled with the revolution of the head wheel in such a manner that the magnetic heads 21 and 22 disposed on the circumference of the head wheel are alternately connected with the reproduction circuit while the corresponding magnetic head passes over the recorded track of the magnetic tape. The signal passes through a controllable distortion corrector 28 and is thereafter demodulated in the demodulator 29. Controllable amplitude frequency response distortion correcting circuits with the necessary properties for correction of the amplitude-frequency response for broadband signals are well known in the art and are known, for example, from German published patent application (Auslegeschrift) No. 12 96 166 and from RCA-Review, Dec. 1953, p. 574.

To the output of the demodulation circuit 29 is connected the input of the burst separating stage 30 in which the color synchronizing signal is fished out of the composite signal. The amplitude of the separated color television signal is compared in the differential amplifier 31 with a reference voltage. For this purpose, the output of the switching stage 30 is connected with the inverting input of the differential amplifier 31 and the noninverting input of the differential amplifier 31 is connected with a reference voltage source (not shown), the output of which is available at 42. At the output of the differential amplifier 31, there are connected, through integration elements 32, 33, 34, storage devices 35, 36, 37 for storing the error magnitudes at the output of this differential amplifier 31. The storage devices 35, 36, 37 have a different number of storage places, each of which can be switched in by an individual switch. Thus, the number of storage places of the storage device 35 corresponds to the number of reproducing magnetic heads on the circumference of the head wheel, the number of storage places of the storage device 36 correspond to the maximum number of lines of the television picture stored in one track of the magnetic tape and the number of storage places in the storage device 37 corresponds to the number of lines of a television picture.

In the case of a magnetic tape apparatus with two reproduction magnetic heads arranged on the circumference of the head wheel, which pass across the magnetic tape in such a manner that the television picture consisting of 625 lines is read out of 12 successive tracks, each with 52 1/12 lines, the storage device 35 contains two storage places 101 and 102, each with an individual switch, S101, S102; the storage device contains 52 storage places 201 . . . 252 with related switches S201 . . . S252 and the storage device 37 contains 625 storage places 1001 . . . 1625 with corresponding switches S1001. . . . S1625. The switches S1001 to S1625 are shown for reasons of simpler representation as mechanical switches, but predominantly semi-conductor devices find application there. Likewise, the representation of the storage places 101, 102, 201 to 252 and 1001 to 1625 as shift registers is not a matter of necessity. In their place other storage devices of analog or digital kind can also be used which fulfill the prescribed purpose.

The output of the differential amplifier 31 is connected to an input, each of a first integration stage 32, a second integration stage 39, and a third integration stage 34. The outputs of the storage devices 35, 36 lead directly, the output of the storage device 37 over a ramp shaper 38, to an addition stage 39, the output of which is connected with the control input of the controllable amplitude-frequency distortion corrector 28.

The actuation of the switches S101, S102, S201 to S252 and S1001 to S1625 results from separate timing signals of which the generation and supplying to the individual switches in the switching arrangement according to FIG. 2 is not part of the subject matter of the invention. Nevertheless, in what follows below the various timing signals are brought out for explanation of the manner of operation of the present circuit arrangement.

The error voltage present at the output of the differential amplifier 31 is supplied in parallel over the integration elements 32, 33, 34 to the respective storage devices 35, 36, 37 for storage of the momentary amplitude deviations of the color synchronizing signal picked up from the magnetic tape in comparison to the reference value present at 32. For the duration of a half revolution of the head wheel, the switch S101 is closed while during the remaining half revolution of the head wheel the switch S102 is closed. For each magnetic head there takes place accordingly formation of an average value of an error signal from the momentary error magnitude at the output of the differential amplifier 31 and the loading respectively of the storage places 101 and 102. This error averaged over a half revolution of the head wheel is supplied to the addition stage 39.

In a like way the momentary error signal is supplied to the storage device 36. The 52 storage places 201 and 252 correspond to the number of lines in a track. They are activated at the line frequency by means of the corresponding switches S201 to S252 successively, corresponding to the position of the magnetic head on the track. This error signal is likewise supplied to the addition stage 39. The once per 625 line sequence ($11 \times 52$ lines $+1 \times 53$ lines $= 625$ lines) required error voltage value 53 is provided by repetition of the line 52 value.

Finally, the error signal from the output of the stage 31 is supplied over the integrator 34 to the storage device 37 with 625 storage places 1001 to 1625. Each storage place is related to a storage switch S1001 to S1625. Corresponding to the premise that the line beginnings of successive tracks are shifted relative to the tape edge, the storage switches are closed for obtaining the error course between the lines n and n+1 according to the scheme;

$$\left.\begin{array}{l} n \\ (n+1)+5\cdot 104 \\ (n+1)+4\cdot 104 \\ (n+1)+3\cdot 104 \\ (n+1)+2\cdot 104 \\ (n+1)+1\cdot 104 \\ n+1 \end{array}\right\} \text{intermediate values}$$

In other words, the sequence, beginning with $n=1$, through $n=2$ would run 1,522, 418, 314, 210, 106, 2 . . .

From the error values thus obtained from the storage device 37, a closed curve is formed in the ramp shaper 38. The signal thus resulting is applied to the addition stage 39.

The blanking of the television signal (burst) prescribed by the television standard in the region of the vertical blanking must be taken care of in the timing scheme:

1. The storage device 37 is reduced by the number of the blanked-out bursts.

2. The missing measuring points are obtained by the ramp shaper 38 by interpolation of the neighboring points for each case.

The time-variable error voltage present at the output of the addition stage controls the controllable amplitude-frequency distortion corrector 28 in the sense of an error reduction. The color saturation error based on the above-mentioned error causes are thereby to a great extent avoided in the reproduced picture. In this manner it is possible to determine the amplitude-frequency characteristic errors resulting from different head-tape applied pressure relationships, the so-called chroma errors, six times within one line, and in fact once from the actual amplitude comparison of the color synchronizing signal and five times from the corresponding comparison of previous lines in a similar position to the tape edge.

Figure 3:
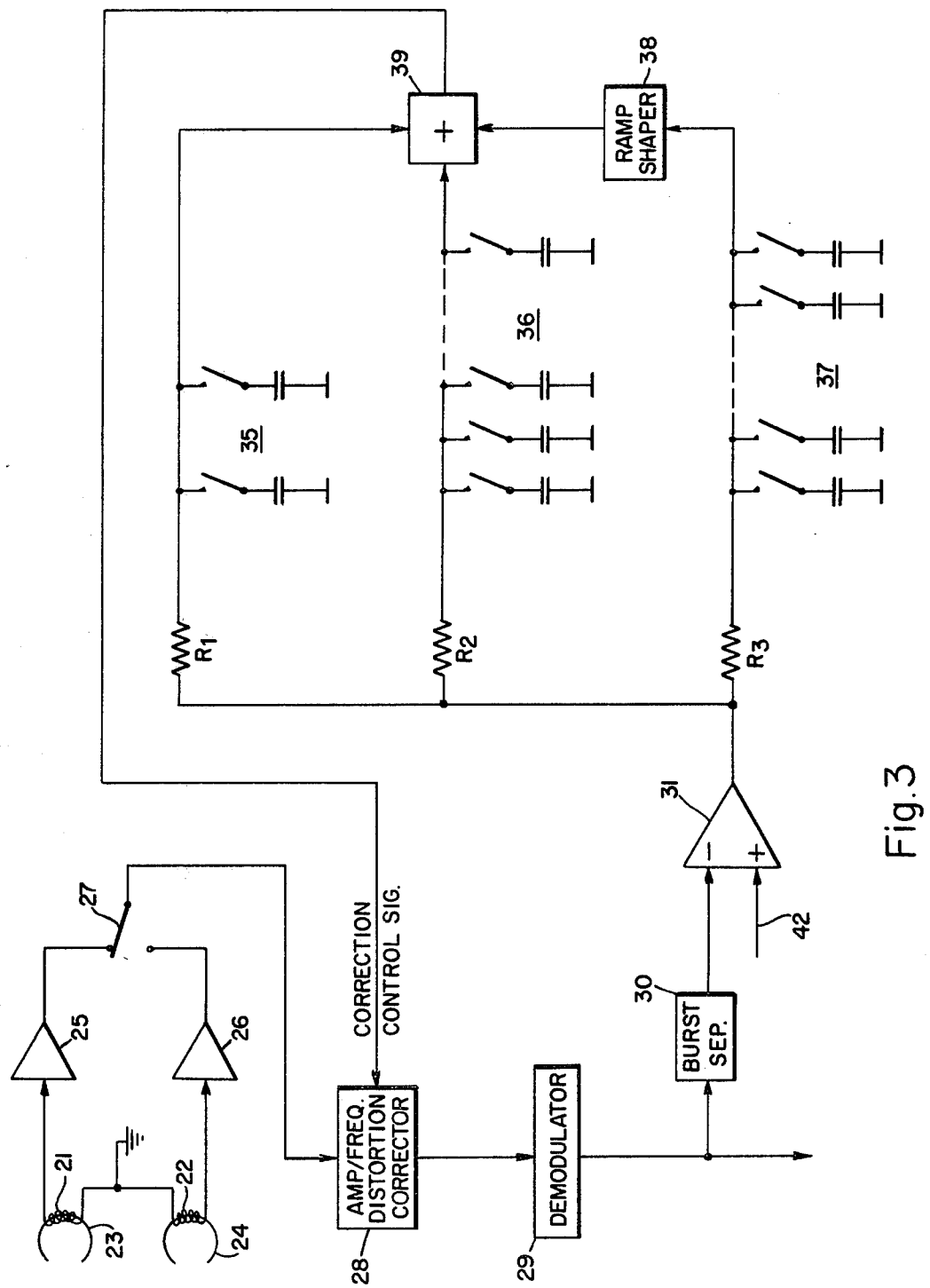
FIG. 3 is a diagram of another embodiment of the invention.

FIG. 3 shows another embodiment example of a circuit arrangement for carrying out the method of the invention. The circuit elements with the reference numerals 21 to 31, 38, 39, 42 correspond in construction and manner of operation completely to those of FIG. 2. They are accordingly designated with the same numerals and connected in the same way. At the output of the differential amplifier 31, (FIG. 3) there are connected storage devices 35, 36, 37 over resistances $R_1$, $R_2$, and $R_3$ for storing the error magnitude. The storage devices 35, 36, 37 have a different number of storage places, shown as capacitors, each of which can be switched in by means of an individual switch. Thus, the number of storage places corresponds exactly as in the circuit arrangement in FIG. 2 to the number of reproduction magnetic heads arranged on the head wheel to the number of lines stored in one track and to the number of lines serving for storage of a television picture respectively. The output of the storage devices 35, 36, 37 are in each case supplied to the addition stage 39 and the output signal of the latter is connected with the control input of the controllable distortion corrector 28. Between the output of the storage device 37 and the addition of stage 39 lies the ramp shaper 38.

I claim:

1. Method of correcting rapid periodic errors in frequency response related to the mechanical magnetic pick-up operation in the playback of color television signals magnetically recorded on adjacent parallel track segments running obliquely on a magnetic tape whereby the synchronizing to track segment with reference to the edge of the tape, comprising the steps of:

comparing with a reference voltage the picked up amplitude of each color burst color-carrier synchronizing signal;

storing each result of the comparison step for a picture frame interval and also, separately, for a track segment interval and for the tape scan period of the active pick-up head;

retrieving the stored comparison results during scan of the tape by each pick-up head in a sequence interleaving results from the previous track scans of the same head during the preceding picture frame interval in the order of increasing distance of the color burst record from the tape edge defining the beginning of a track scan;

producing a continuous correction signal from retrieved comparison results;

simultaneously with said storing step, averaging each comparison result with the stored comparison result most closely corresponding thereto in the last previous picture frame to provide a first average signal, also averaging each comparison result with the stored comparison result for the same track segment position in the last previous track segment to provide a second average signal, and averaging each comparison result with the stored comparison result of the last previous period of the active pick-up head to provide a third average signal;

modifying said correction signal by additively combining it with said first, second and third average signals, and thereafter utilizing said correction signal to correct the frequency response of picked-up television signals.

2. Apparatus for correcting rapid frequency response errors related to the mechanical magnetic pick-up operation in playback, by at least one magnetic pick-up head, of color television signals recorded on oblique tracks on a magnetic tape, comprising:

means (28) for controllable correction of the amplitude-frequency response in the playback of said color television signals, having a signal input connection to a source of color television signals and having a control input;

a demodulator (29) connected to the output of said response-correction circuit;

means (30) connected to the output of said demodulator (29) for separating color synchronizing burst signals from other playback signals for determining the amplitude level thereof;

means (42) for supplying a reference voltage of a predetermined voltage level;

means (31) for comparing the output of said separating means with said reference voltage and producing an error signal therefrom;

first storage means for storing (37) signals corresponding to said error signals and first retrieving means (S1001 ... S1625) for retrieving the signals thus stored, during each scan of said tape by a pick-up magnetic head, in sequence predetermined for interleaving the retrieved signals relating to color synchronizing burst signals picked up by the same head within a past picture frame period with the times of arrival of currently picked-up color synchronizing burst signals, in order of spacing of the record of said burst signals from the edge of said tape crossed by said head at the beginning of a scan;

first averaging means (34) associated with said first storage means (37) for averaging a currently produced error signal with a corresponding previously stored signal and storing the average so formed as the output of said comparison means (31) for subsequent retrieval by said retrieving means (S1001 ... S1625);

means (38) for making a closed curve of the averaged and stored signals retrieved by said first retrieving means;

second averaging (33) and storing (36) means for separately storing average error signals corresponding to said error signals for a track scan period after averaging said error signals with the value of the corresponding average signal stored in a previous scan;

second retrieving means (S201 ... S252) for retrieving said error signals averaged and stored by said second averaging and storage means in a sequence corresponding to said predetermined sequence;

means (38, 39) for making a continuous correction signal by additively combining the respective signals contemporaneously retrieved by said first and second retrieving means, the former being supplied to said combining means as made into a closed curve, and means (28) for applying said continuous correction signal to said control input of said response correction circuit, ahead of said separating means, for correction of the response of said playback signals.

3. Apparatus as defined in claim 2 in which third averaging (32) and storing (101,102) means are provided for averaging and storing said error signals over each track scan period separately for signals derived from color bursts picked up by each of a plurality of magnetic heads (23,24) and in which apparatus third retrieving means are provided for retrieving said thereby averaged and stored error signals during individual scans of the corresponding heads and supplying them to said additional combining means (39) for additively combining them with the respective signals contemporaneously retrieved by said first and second retrieving means, said additive combining means having the capability of combining the contemporaneous signals retrieved by said first, second and third retrieving means.

* * * * *

UNITED STATES PATENT AND TRADEMARK OFFICE
CERTIFICATE OF CORRECTION

PATENT NO. : 4,445,142
DATED : April 24, 1984
INVENTOR(S) : Winfried HORSTMANN

It is certified that error appears in the above-identified patent and that said Letters Patent is hereby corrected as shown below:

Claim 1, col. 6, lines 24, 25

"synchronizing to track segment with reference to"

should be

-- synchronizing signals are progressively offset from track segment to track segment with reference to --

Signed and Sealed this

Twelfth Day of February 1985

[SEAL]

Attest:

DONALD J. QUIGG

Attesting Officer

Acting Commissioner of Patents and Trademarks